United States Patent
Akamatsu et al.

(10) Patent No.: US 10,534,098 B2
(45) Date of Patent: Jan. 14, 2020

(54) RADIOGRAPHIC IMAGING APPARATUS

(71) Applicant: FUJIFILM Corporation, Minato-ku, Tokyo (JP)

(72) Inventors: Keiichi Akamatsu, Kanagawa (JP); Shinichi Ushikura, Kanagawa (JP); Takeya Meguro, Kanagawa (JP); Haruyasu Nakatsugawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/890,372

(22) Filed: Feb. 7, 2018

(65) Prior Publication Data

US 2018/0275292 A1 Sep. 27, 2018

(30) Foreign Application Priority Data

Mar. 22, 2017 (JP) .................. 2017-056560

(51) Int. Cl.
| | |
|---|---|
| *G01T 1/36* | (2006.01) |
| *G01T 1/16* | (2006.01) |
| *G06T 11/00* | (2006.01) |
| *H04N 5/32* | (2006.01) |

(52) U.S. Cl.
CPC ............. *G01T 1/362* (2013.01); *G01T 1/16* (2013.01); *G06T 11/00* (2013.01); *H04N 5/32* (2013.01)

(58) Field of Classification Search
CPC ........... G01T 1/16; G01T 1/362; G06T 11/00; H04N 5/32
See application file for complete search history.

(56) References Cited

U.S. PATENT DOCUMENTS

| | | | | |
|---|---|---|---|---|
| 2014/0027636 A1* | 1/2014 | Watano | .................. | G01T 1/16 250/336.1 |
| 2014/0219422 A1* | 8/2014 | Nishino | ................ | G06T 11/005 378/62 |

FOREIGN PATENT DOCUMENTS

| | | |
|---|---|---|
| JP | H09-152486 A | 6/1997 |
| JP | 2012-122841 A | 6/2012 |
| JP | 2014-025847 A | 2/2014 |

OTHER PUBLICATIONS

English language translation of the following: Office action dated Dec. 3, 2019 from the JPO in a Japanese patent application No. 2017-056560 corresponding to the instant patent application. This office action translation is submitted now in order to supplement the understanding of the cited references which are being disclosed in the instant Information Disclosure Statement.

* cited by examiner

*Primary Examiner* — Mark R Gaworecki
(74) *Attorney, Agent, or Firm* — SOLARIS Intellectual Property Group, PLLC (57) ABSTRACT

A radiographic imaging apparatus includes a sensor board including a flexible substrate, and a plurality of pixels that are provided on a first surface of the substrate to accumulate electrical charges generated in accordance with light converted from radiation. Additionally, the radiographic imaging apparatus includes flexible cables having one ends electrically connected to the sensor board and the other ends provided with connectors, and flexible cables on which signal processing circuit parts are mounted and which are connected electrically to the cables by the one ends thereof being electrically connected to the connectors. Additionally, the radiographic imaging apparatus includes flexible cables having one ends electrically connected to the sensor board and the other ends provided with connectors, and flexible cables on which drive circuit parts are mounted and which are connected electrically to the cables by the one ends thereof being electrically connected to the connectors.

12 Claims, 9 Drawing Sheets

RADIOGRAPHIC IMAGING APPARATUS

CROSS-REFERENCE TO RELATED APPLICATION

This application claims priority under 35 USC 119 from Japanese Patent Application No. 2017-056560 filed Mar. 22, 2017, the disclosure of which is incorporated by reference herein.

BACKGROUND

Technical Field

The present invention relates to a radiographic imaging apparatus.

Related Art

In the related art, radiographic imaging apparatuses that perform radiographic imaging for medical diagnosis have been known. Such radiographic imaging apparatuses include a sensor board in which a plurality of pixels that accumulate electrical charges generated in accordance with light converted from radiation are provided on a substrate, and a radiation detector that detects the radiation transmitted through a subject by this sensor board to generate a radiographic image is used.

In such a radiation detector, by electrically connecting circuit parts provided outside the sensor board and the sensor board together, the electrical charges accumulated in the respective pixels are read by driving of the circuit parts. The connection between the sensor board and the circuit parts is made by electrically connecting cables, such as flexible cables, to the substrate of the sensor board.

A radiographic imaging apparatus in which the circuit parts used for the reading of the electrical charges are mounted on the cables that electrically connects the circuit parts and the sensor board together and are formed as chips on a film (COF) is known (refer to JP1997-152486A (JP-H09-152486A)).

SUMMARY

Generally, in a case where cables that electrically connects the circuit parts and a pixel group together are connected to the substrate of the sensor board, there is a case where so-called reworking of detaching the cables connected to the substrate of the sensor board to newly reconnect the cables is performed due to the deviation of the connecting positions of the cables, a problem of the circuit parts mounted in the case of the cables on which the circuit parts are mounted, or the like.

Meanwhile, it is desired to use a flexible substrate for the sensor board. By using the flexible substrate, for example, there is a case where the weight of the radiographic imaging apparatus (radiation detector) can be reduced and imaging of a subject becomes easy.

In a case where the substrate used for the sensor board is flexible, for example, there is a case where the reworking in the connection of the cables to the sensor board is not easily performed due to deflection of the substrate, or the like.

An object of the present disclosure is to provide a radiographic imaging apparatus that can easily perform reworking on a sensor board.

In order to achieve the above object, a radiographic imaging apparatus of the present disclosure comprises a sensor board including a flexible substrate, and a plurality of pixels that are provided on a first surface of the substrate to accumulate electrical charges generated in accordance with light converted from radiation; a first flexible cable having one end electrically connected to the sensor board and the other end provided with a first connector; and at least one of a board on which a circuit part to be driven in a case where an electrical charge accumulated in each of the plurality of pixels is read is mounted and which is electrically connected to the first cable by being electrically connected to the first connector, and a second flexible cable on which the circuit part is mounted and which is electrically connected to the first cable by one end thereof being electrically connected to the first connector.

Additionally, the radiographic imaging apparatus of the present disclosure may further comprise a control board on which a control unit that controls the reading of the electrical charges accumulated in the plurality of pixels of the sensor board is mounted, and the other end of the second cable may be provided with the second connector in a case where the second cable is provided, and the second cable and the control board are electrically connected together by the second connector.

Additionally, the radiographic imaging apparatus of the present disclosure may further comprise a control board on which a control unit that controls the reading of the electrical charges accumulated in the plurality of pixels of the sensor board is mounted, and the other end of the second cable may be electrically connected to the control board by a thermo-compression part in a case where the second cable is provided.

Additionally, in the radiographic imaging apparatus of the present disclosure, the circuit part may include a circuit of a signal processing unit to which electrical signals according to the electrical charges accumulated in the plurality of pixels are input and which generates and outputs image data according to the input electrical signals.

Additionally, the radiographic imaging apparatus of the present disclosure may further comprise a flexible third cable on which a drive unit, which causes the electrical charges to be read from the plurality of pixels, is mounted and which has one end electrically connected to the sensor board.

Additionally, in the radiographic imaging apparatus of the present disclosure, the circuit part may include a circuit of a drive unit that causes the electrical charges to be read from the plurality of pixels.

Additionally, in the radiographic imaging apparatus of the present disclosure, the circuit part may include a circuit of a signal processing unit to which electrical signals according to the electrical charges accumulated in the plurality of pixels are input and which generates and outputs image data according to the input electrical signals, a signal processing board may be further provided, which is included in the signal processing unit and on which a circuit different from the circuit included in the circuit part is mounted, the other end of the second cable may be provided with the second connector in a case where the second cable is provided, and the second cable and the signal processing board are electrically connected together by the second connector.

Additionally, in the radiographic imaging apparatus of the present disclosure, the circuit part may include a circuit of a signal processing unit to which electrical signals according to the electrical charges accumulated in the plurality of pixels are input and which generates and outputs image data according to the input electrical signals, a signal processing board may be further provided, which is included in the signal processing unit and on which a circuit different from the circuit included in the circuit part is mounted, and the other end of the second cable may be electrically connected to the signal processing board by a thermocompression part in a case where the second cable is provided.

Additionally, in the radiographic imaging apparatus of the present disclosure, the circuit part may include a circuit of a drive unit that causes the electrical charges to be read from the plurality of pixels, a driving substrate may be further provided, which is included in the drive unit and on which a circuit different from the circuit included in the circuit part is mounted, and the other end of the second cable may be provided with the second connector in a case where the second cable is provided, and the second cable and the driving substrate are electrically connected together by the second connector.

Additionally, in the radiographic imaging apparatus of the present disclosure, the circuit part may include a circuit of a drive unit that causes the electrical charges to be read from the plurality of pixels, a driving substrate may be further provided, which is included in the drive unit and on which a circuit different from the circuit included in the circuit part is mounted, and the other end of the second cable may be electrically connected to the driving substrate by a thermocompression part in a case where second cable is provided.

Additionally, in the radiographic imaging apparatus of the present disclosure, the first cable may include a ground electrode that supplies a predetermined ground potential.

Additionally, in the radiographic imaging apparatus of the present disclosure, the flexible substrate may be a resinous sheet.

According to the present disclosure, the reworking on the sensor board can be easily performed.

BRIEF DESCRIPTION OF THE DRAWINGS

Exemplary Embodiments of the present invention will be described in detail with reference to the following figures, wherein.

DETAILED DESCRIPTION

Hereinafter, embodiments of the invention will be described in detail with reference to the drawings. In addition, the present embodiments do not limit the invention.

First Embodiment

A radiographic imaging apparatus of the present embodiment has a function of capturing a radiographic image of an object to be imaged, by detecting radiation transmitted through a subject, which is an object to be imaged, and outputting image information representing a radiographic image of the subject.

Figure 1:
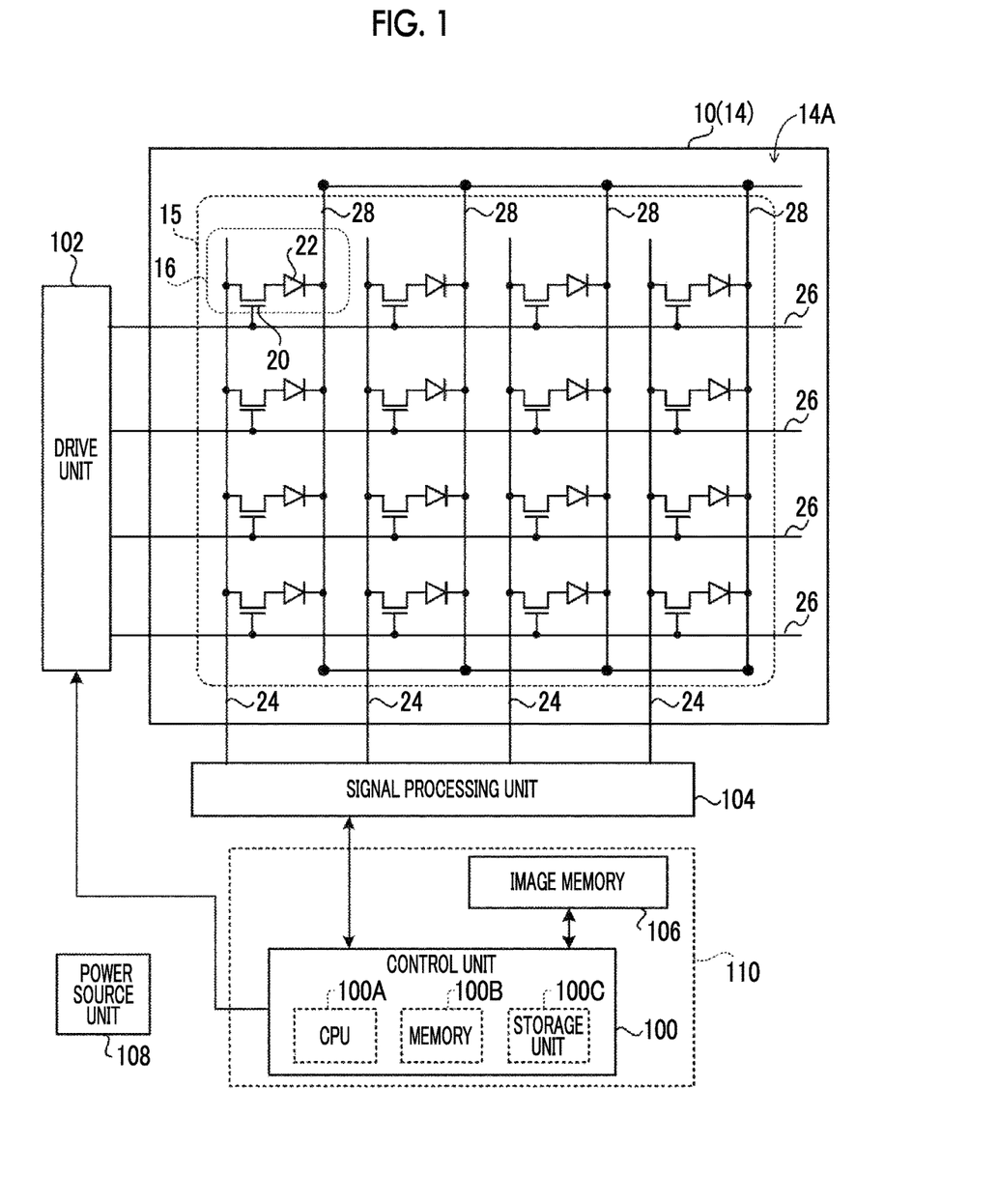
FIG. 1 is a block diagram illustrating an example of the configuration of main parts of an electrical system in a radiographic imaging apparatus of a first embodiment, and is also a configuration view illustrating an example of the configuration of a sensor board in a radiation detector.

First, the outline of an example of the configuration of an electrical system in the radiographic imaging apparatus of the present embodiment will be described with reference to FIG. 1. FIG. 1 is a block diagram illustrating an example of the configuration of main parts of the electrical system in the radiographic imaging apparatus of the present embodiment.

As illustrated in FIG. 1, the radiographic imaging apparatus 1 of the present embodiment includes a radiation detector 10, a control unit 100, a drive unit 102, a signal processing unit 104, an image memory 106, and a power source unit 108.

The radiation detector 10 includes a sensor board 12 (refer to FIG. 2) and a conversion layer (refer to FIG. 2) that converts radiation into light. The sensor board 12 includes a flexible substrate 14 and a plurality of pixels 16 provided on a first surface 14A of the substrate 14. In addition, in the following, the plurality of pixels 16 are simply referred to as "pixels 16".

As illustrated in FIG. 1, each pixel 16 of the present embodiment includes a sensor part 22 that generates and accumulates an electrical charge in accordance with the light converted by the conversion layer, and a switching element 20 that reads the electrical charge accumulated in the sensor part 22. In the present embodiment, as an example, a thin film transistor (TFT) is used as the switching element 20. For that reason, in the following, the switching element 20 is referred to as a "TFT 20". In the present embodiment, a layer in which the pixels 16 are formed on the first surface 14A of the substrate 14 is provided as a flattened layer in which the sensor parts 22 and the TFTs 20 are formed.

The pixels 16 are two-dimensionally disposed in one direction (a scanning wiring direction corresponding to a transverse direction of FIG. 1, hereinafter referred to as a "row direction"), and a direction intersecting the row direction (a signal wiring direction corresponding to the longitudinal direction of FIG. 1, hereinafter referred as a "column direction") in an active area 15 of the sensor board 12. Although an array of the pixels 16 are illustrated in a simplified manner in FIG. 1, for example, 1024×1024 pixels 16 are disposed in the row direction and the column direction.

Additionally, a plurality of scanning wiring lines 26, which are provided for respective rows of the pixels 16 to control switching states (ON and OFF) of the TFTs 20, and a plurality of signal wiring lines 24, which are provided for respective columns of the pixels 16 and from which electrical charges accumulated in the sensor parts 22 are read, are provided in a mutually intersecting manner in the radiation detector 10. The plurality of scanning wiring lines 26 are respectively connected to the drive unit 102 via terminals (not illustrated), respectively, and thereby, driving signals, which are output from the drive unit 102 to drive the TFTs 20 to control the switching states thereof, flow to the plurality of scanning wiring lines 26, respectively. Additionally, the plurality of signal wiring lines 24 are respectively connected to the signal processing unit 104 via terminals (not illustrated), respectively, and thereby, electrical charges read from the respective pixels 16 are output to the signal processing unit 104 as electrical signals. The signal processing unit 104 generates and outputs image data according to the input electrical signals.

The control unit 100 to be described below is connected to the signal processing unit 104, and the image data output from the signal processing unit 104 is sequentially output to the control unit 100. The image memory 106 is connected to the control unit 100, and the image data sequentially output from the signal processing unit 104 is sequentially stored in the image memory 106 under the control of the control unit 100. The image memory 106 has a storage capacity capable of storing image data equivalent to a predetermined number of sheets, and whenever radiographic images are captured, image data obtained by the capturing is sequentially stored in the image memory 106.

The control unit 100 includes a central processing unit (CPU) 100A, a memory 100B including a read only memory (ROM), a random access memory (RAM), and the like, and a nonvolatile storage unit 100C, such as a flash memory. An example of the control unit 100 is a microcomputer or the like. The control unit 100 controls the overall operation of the radiographic imaging apparatus 1.

In addition, in the radiographic imaging apparatus 1 of the present embodiment, the image memory 106, the control unit 100, and the like are formed in the control board 110.

Additionally, common wiring lines 28 are provided in a wiring direction of the signal wiring lines 24 at the sensor parts 22 of the respective pixels 16 in order to apply bias voltages to the respective pixels 16. Bias voltages are applied to the respective pixels 16 from a bias power source by connecting the common wiring lines 28 to the bias power source (not illustrated) outside the sensor board 12 via a pad (not illustrated).

The power source unit 108 supplies electrical power to various elements or various circuits, such as the control unit 100, the drive unit 102, the signal processing unit 104, the image memory 106, and power source unit 108. In addition, in FIG. 1, illustration of wiring lines, which connect the power source unit 108 and various elements or various circuits together, is omitted in order to avoid complication.

Figure 2:
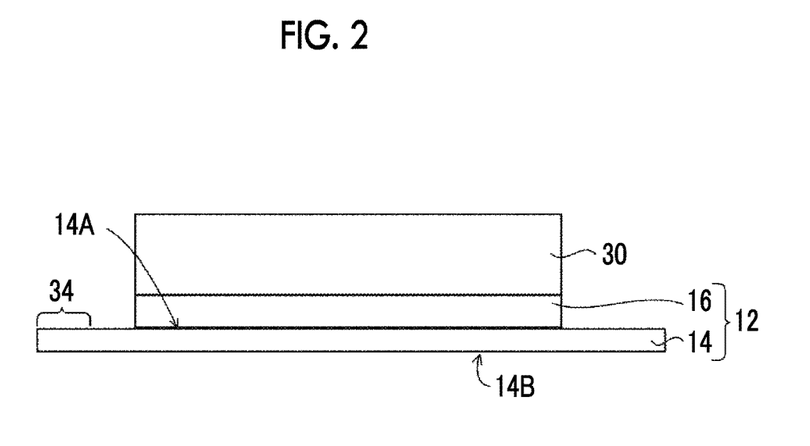
FIG. 2 is a cross-sectional view illustrating the outline of an example of the configuration of a radiation detector of a first embodiment.

Moreover, the radiation detector 10 of the present embodiment will be described in detail. FIG. 2 is a cross-sectional view illustrating the outline of an example of the radiation detector 10 of the present embodiment.

As illustrated in FIG. 2, the radiation detector 10 of the present embodiment includes the sensor board 12 including the substrate 14 and the pixels 16, and a conversion layer 30, and the substrate 14, the pixels 16, and the conversion layer 30 are provided in this order. In addition, in the following, a direction (upward-downward direction in FIG. 2) in which the substrate 14, the pixels 16, and the conversion layer 30 are arranged is referred to as a lamination direction.

The substrate 14 is a resinous sheet having flexibility and including, for example, plastics, such as polyimide. A specific example of the substrate 14 is XENOMAX (registered trademark). In addition, the substrate 14 may have any desired flexibility and is not limited to the resin sheet. For example, the substrate 14 may be a relatively thin glass substrate. The thickness of the substrate 14 may be a thickness such that desired flexibility is obtained in accordance with the hardness of a material, the size of the sensor board 12 (the area of the first surface 14A or the second surface 14B), or the like. For example, in a case where the substrate 14 is the resin sheet, the thickness thereof may be 5 μm to 125 μm. Additionally, in a case where the substrate 14 is the glass substrate, the substrate 14 has flexibility in a case where the thickness thereof becomes 0.3 mm or less in a size in which one side is 43 cm or less. Therefore, the thickness may be 0.3 mm or less.

As illustrated in FIG. 2, the plurality of pixels 16 are provided in an inner partial region on the first surface 14A of the substrate 14. That is, in the sensor board 12 of the present embodiment, no pixel 16 is provided at an outer peripheral part of the first surface 14A of the substrate 14. In the present embodiment, the region on the first surface 14A of the substrate 14 where the pixels 16 are provided is used as the active area 15. In addition, in the present embodiment, as an example, the pixels 16 are provided on the first surface 14A of the substrate 14 via an undercoat layer (not illustrated) using SiN or the like.

Figure 3:
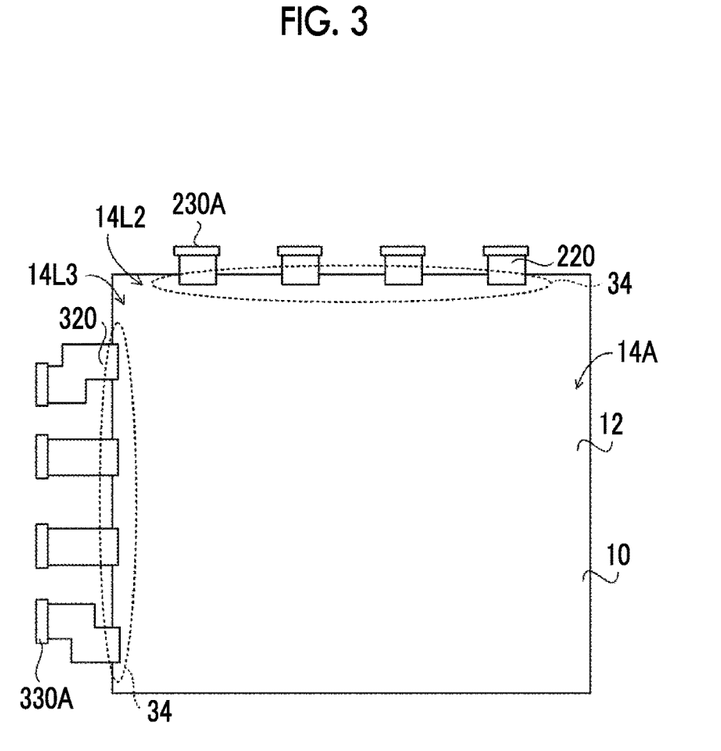
FIG. 3 is a plan view of an example a state where cables are connected to terminal regions of the radiation detector of the first embodiment, as seen from a first surface side of a substrate.

Additionally, as illustrated in FIG. 2, terminal regions 34 including terminals electrically connected to the signal wiring lines 24 or the scanning wiring lines 26 are provided at an outer periphery of the first surface 14A of the substrate 14. As illustrated in FIG. 3, flexible cables 220 and flexible (having flexibility) cables 320 are electrically connected to the terminals (not illustrated) provided in the terminal regions 34. In addition, in the present embodiment, connection regarding components referred to as "cables" including the cables 220 and the cables 320 means electrical connection unless otherwise mentioned. In addition, the cables 220 and the cables 320 include signal lines 150 (refer to FIG. 10A and FIG. 10B) consisting of conductors, and are electrically connected by the connection of the signal lines. The cables 220 and cables 320 of the present embodiment are examples of a first cable of the present disclosure. Additionally, in the following, the "cables" means flexible (having flexibility) cables.

A plan view of an example of a state where the cables 220 and the cables 320 are connected to the terminal regions 34 of the radiation detector 10 of the present embodiment, as seen from the first surface 14A side of the substrate 14, is illustrated in FIG. 3. As illustrated in FIG. 3, in the present embodiment, the terminal regions 34 are respectively provided at an outer edge 14L2 and an outer edge 14L3 of two adjacent sides of the rectangular radiation detector 10.

In the outer edge 14L2, one ends of the plurality (four in FIG. 3) of cables 220 are connected to the terminals (not illustrated) formed in a terminal region 34 by thermocompression. The cables 220 have a function of connecting the drive unit 102 and the scanning wiring lines 26 together (to refer to FIG. 1). The plurality of signal lines 150 (refer to FIG. 10A and FIG. 10B) included in a cable 220 are connected to the scanning wiring lines 26 (refer to FIG. 1) via the terminals formed in the connected terminal region 34. The other ends of the cables 220 are respectively provided with connectors 230A. The connectors 230A of the present embodiment are examples of a first connector of the present disclosure.

In addition, connectors 230, connectors 236 to be described below, connectors 330, and connectors 336 are, for example, connectors of a zero insertion force (ZIF) structure or connectors of a Non-ZIF structure.

Meanwhile, in the outer edge 14L3, one ends of the plurality (four in FIG. 3) of cables 320 are connected to the terminals (not illustrated) formed in a terminal region 34 by thermocompression. The plurality of signal lines 150 (refer to FIG. 10A and FIG. 10B) included in a cable 320 are connected to the signal wiring lines 24 (refer to FIG. 1) via the terminals formed in the connected terminal region 34. The cables 320 have a function of connecting the signal processing unit 104 and the signal wiring lines 24 together (to refer to FIG. 1). The other ends of the cables 320 are respectively provided with connectors 330A. The connectors 330A of the present embodiment are examples of the first connector of the present disclosure.

Additionally, as illustrated in FIG. 2, the conversion layer 30 covers the active area 15. In the present embodiment, a scintillator including CsI (cesium iodide) is used as an example of the conversion layer 30. It is preferable that such a scintillator includes, for example, CsI:Tl (cesium iodide to which thallium is added) or CsI:Na (cesium iodide to which sodium is added) having an emission spectrum of 400 nm to 700 nm at the time of X-ray irradiation. In addition, the emission peak wavelength in a visible light region of CsI:Tl is 565 nm.

In the present embodiment, the conversion layer 30 of CsI is directly formed as a columnar crystal on the sensor board 12 by a vapor-phase deposition method, such as a vacuum vapor deposition method, a sputtering method, and a chemical vapor deposition (CVD) method. In this case, the side of the conversion layer 30, which in contact with the pixels 16, becomes a base point side in a growth direction of the columnar crystal.

In addition, in this way, in a case where the conversion layer of CsI is directly formed on the sensor board 12 by the vapor-phase deposition method, for example, a reflective layer (not illustrated) having a function of reflecting the light converted in the conversion layer 30 may be provided on the surface of the conversion layer opposite to the side in contact with the sensor board 12. The reflective layer may be directly provided in the conversion layer 30, and or may be provided via an adhesion layer or the like. As a material of the reflective layer in this case, it is preferable to use an organic material, and it is preferable to use, for example, at least one of white polyethylene terephthalate (PET), $TiO_2$, $Al_2O_3$, foamed white PET, a polyester-based high-reflection sheet, specular reflection aluminum, or the like. Particularly, it is preferable to use the white PET as the material from a viewpoint of reflectivity.

In addition, the white PET is obtained by adding a white pigment, such as $TiO_2$ or barium sulfate, to PET. Additionally, the polyester-based high-reflection sheet is a sheet (film) having a multilayer structure in which a plurality of thin polyester sheets are laminated. Additionally, the foamed white PET is white PET of which the front surface is porous.

Additionally, in a case where the scintillator of CsI is used as the conversion layer 30, the conversion layer 30 can also be formed in the sensor board 12 by a method different from that of the present embodiment. For example, the conversion layer 30 may be formed in the sensor board 12 by preparing CsI vapor-deposited on an aluminum sheet or the like by the vapor-phase deposition method, and gluing the side of CsI, which is not in contact with the aluminum sheet, and the pixels 16 of the sensor board 12 together with an adhesive sheet or the like.

Moreover, unlike the radiation detector 10 of the present embodiment, GOS ($Gd_2O_2S$:Tb) or the like may be used as the conversion layer 30 instead of CsI. In this case, for example, the conversion layer 30 can be formed in the sensor board 12 by preparing a sheet glued on a support formed of the white PET or the like with an adhesion layer or the like, the sheet being obtained by dispersing GOS in a binder, such as resin, and by gluing the side of GOS on which the support is not glued, and the pixels 16 of the sensor board 12 together with an adhesive sheet or the like.

In addition, a protective film or an antistatic film that covers a part or the entirety of the radiation detector 10 or the conversion layer 30 or the like may be provided. The protective film is, for example, a PARYLENE (registered trademark) film, an insulating sheet, such as polyethylene terephthalate, or the like is used. Additionally, the antistatic film, for example, an LAPPET (registered trademark) sheet obtained by laminating aluminum, such as by bonding aluminum foil, on the insulating sheet (film), such as polyethylene terephthalate, or a film using an antistatic coating material "COLCOAT" (trade name: made by COLCOAT CO., LTD), or the like.

Figure 4:
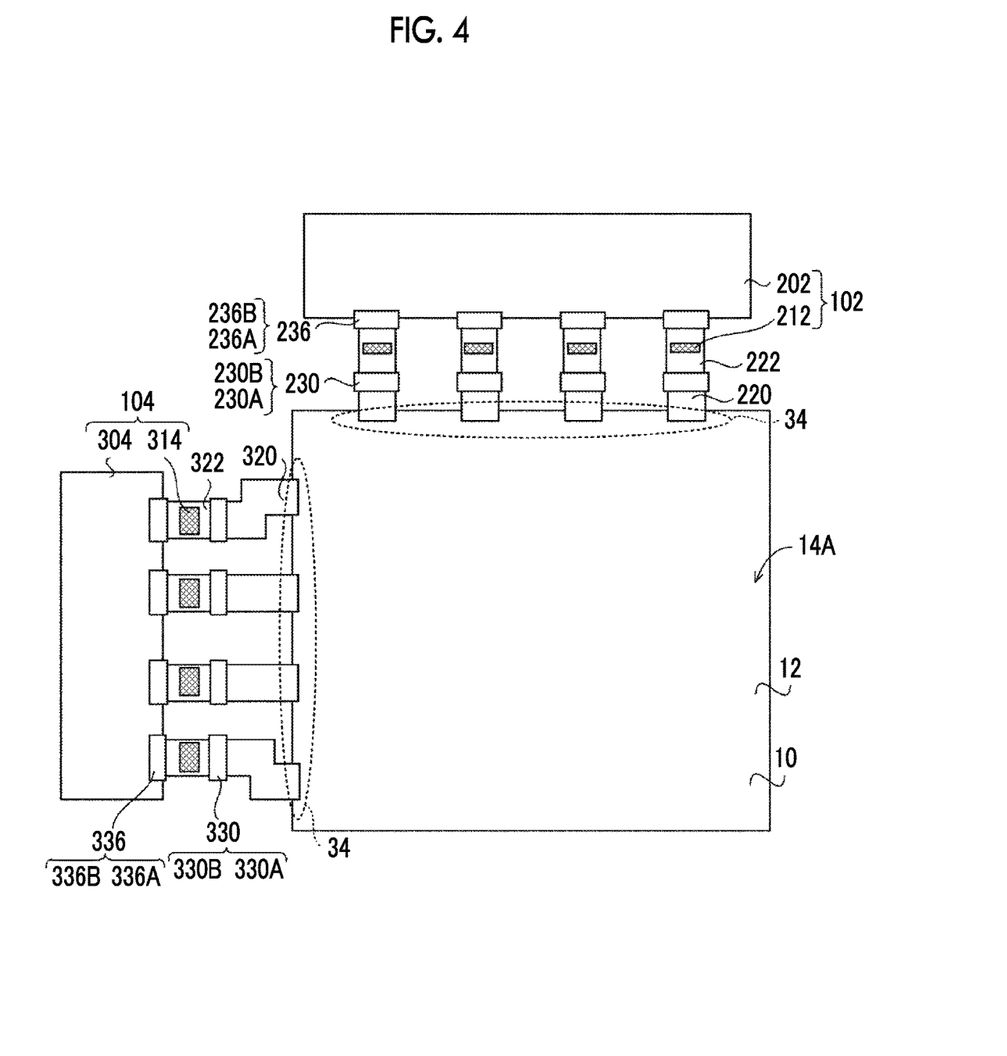
FIG. 4 is a plan view of an example of a state where a drive unit and a signal processing unit are connected to the radiation detector of the first embodiment, as seen from the first surface side of the substrate.

Next, the connection between the radiation detector 10 of the present embodiment, and the drive unit 102 and the signal processing unit 104 will be described in detail. A plan view of an example of a state where the drive unit 102 and the signal processing unit 104 are connected to the radiation detector 10 of the present embodiment, as seen from the first surface 14A side of the substrate 14, is illustrated in FIG. 4.

In the present embodiment, the drive unit 102 is realized by circuits and elements that are mounted on a driving substrate 202, and drive circuit parts 212. The drive circuit parts 212 are integrated circuits (ICs) including circuits different from the circuits mounted on the driving substrate 202 among various circuits and elements that realize the drive unit 102.

Each drive circuit part 212 is mounted on each cable 222, and is connected to a plurality of signal lines included in the cable 222. The cables 222 of the present embodiment are examples of a second cable of the present disclosure. Connectors 230B are provided at one ends of the cables 222, and connectors 236A are provided at the other ends of the cables 222. The connectors 236A of the present embodiment are examples of a second connector of the present disclosure. The connectors 230B of the cables 222 and the connectors 230A provided in the cables 220 connected to the sensor board 12 are connected together. In the following, the connectors 230A and the connectors 230B are simply referred to as "connectors 230" in a case where these connectors are generically referred to without being distinguished from each other.

Additionally, a plurality of connectors 236B connected to the various circuits and elements that are mounted on the driving substrate 202 are provided in a region of an end part of the driving substrate 202. The connectors 236B provided in the driving substrate 202 and the connectors 236A of the cables 222 are connected together. In the following, the connectors 236A and the connectors 236B are simply referred to as "connectors 236" in a case where these connectors are generically referred to without being distinguished from each other.

As illustrated in FIG. 4, the drive unit 102 and the respective scanning wiring lines 26 are connected together by the cables 222 and the cables 220 connected to the sensor board 12 being connected together by the connectors 230 and the cables 222 and the driving substrate 202 being connected together by the connectors 236.

Meanwhile, in the present embodiment, the signal processing unit 104 is realized by circuits and elements that are mounted on the signal processing unit 104, and signal processing circuit parts 314. The signal processing circuit parts 314 are ICs including circuits different from the circuits mounted on a signal processing board 304 among various circuits and elements that realize the signal processing unit 104.

Each signal processing circuit part 314 is mounted on each cable 322, and is connected to a plurality of signal lines included in the cable 322. The cables 322 of the present embodiment are examples of the second cable of the present disclosure. Connectors 330B are provided at one ends of the cables 322, and connectors 336A are provided at the other ends of the cables 322. The connectors 336A of the present embodiment are examples of the second connector of the present disclosure. The connectors 330B of the cables 322 and the connectors 330A provided in the cables 320 connected to the sensor board 12 are connected together. In the following, the connectors 330A and the connectors 330B are simply referred to as "connectors 330" in a case where these connectors are generically referred to without being distinguished from each other.

Additionally, a plurality of connectors 336B connected to the various circuits and elements that are mounted on the signal processing board 304 are provided in a region of an end part of the signal processing board 304. The connectors 336B provided in the signal processing board 304 and the connectors 336A of the cables 322 are connected together. In the following, the connectors 336A and the connectors 336B are simply referred to as "connectors 336" in a case where these connectors are generically referred to without being distinguished from each other.

As illustrated in FIG. 4, the signal processing unit 104 and the respective signal wiring lines 24 are connected together by the cables 322 and the cables 320 connected to the sensor board 12 being connected together by the connectors 330 and the cables 322 and the signal processing board 304 being connected together by the connectors 336.

As described above, the radiographic imaging apparatus 1 of the present embodiment includes the sensor board 12 including the flexible substrate 14, and the plurality of pixels 16 that are provided on the first surface 14A of the substrate 14 to accumulate the electrical charges generated in accordance with the light converted from radiation. Additionally, the radiographic imaging apparatus 1 includes the flexible cables 320 having the one ends electrically connected to the sensor board 12 and the other ends provided with the connectors 230A, and the flexible cables 322 on which the signal processing circuit parts 314 to be driven in a case where the electrical charges accumulated in the plurality of pixels 16 are read are mounted and which are connected electrically to the cables 320 by the one ends thereof being electrically connected to the connectors 330. Additionally, the radiographic imaging apparatus 1 includes the flexible cables 220 having the one ends electrically connected to the sensor board 12 and the other ends provided with the connectors 330A and the flexible cables 220 on which the drive circuit parts 212 to be driven in a case where the electrical charges accumulated in the plurality of pixels 16 are read are mounted and which are connected electrically to the cables 222 by the one ends thereof being electrically connected to the connectors 230.

In this way, in the radiographic imaging apparatus 1 of the present embodiment, the connectors 230A are provided in the cables 220 connected to the sensor board 12 of the radiation detector 10. Additionally, the cables 222 are provided with the connectors 236A for connection with the driving substrate 202.

Accordingly, in the radiographic imaging apparatus 1 of the present embodiment, in a case where the drive unit 102 is connected to the sensor board 12, the cables 222 on which the drive circuit parts 212 are mounted may be connected to the cables 220 connected to the sensor board 12 by the connectors 230, and the driving substrate 202 and the cables 222 may be connected together by the connectors 236.

In this way, the drive unit 102 and the sensor board 12 can be connected together by the connectors 230 and the connectors 236. Therefore, in the sensor board 12, deviation of the connecting positions of the cables (the cables 222 in the present embodiment) on which the drive circuit parts 212 are mounted can be suppressed. Additionally, attachment and detachment of the drive unit 102 become easy.

In addition, in the following, detaching the drive unit 102 or the signal processing unit 104 from the sensor board 12 to newly reconnect the drive unit 102 or the signal processing unit 104 due to a problem, positional deviation, or the like of the drive unit 102 or the signal processing unit 104 is referred to as "reworking".

Additionally, in the radiographic imaging apparatus 1 of the present embodiment, the connectors 330A are provided in the cables 320 connected to the sensor board 12 of the radiation detector 10. Additionally, the cables 322 are provided with the connectors 336A for connection with the signal processing board 304.

Accordingly, in the radiographic imaging apparatus 1 of the present embodiment, in a case where the signal processing unit 104 is connected to the sensor board 12, the cables 322 on which the signal processing circuit parts 314 are mounted may be connected to the cables 320 connected to the sensor board 12 by the connectors 330, and the signal processing board 304 and the cables 322 may be connected together by the connectors 336.

Additionally, in a case where the cables 222 on which the drive circuit parts 212 are mounted or the cables 322 on which the signal processing circuit parts 314 are mounted are directly connected to the sensor board 12 unlike the present embodiment, for example, there is a case where the substrate 14 of the sensor board 12 is deflected due to the weight of the drive circuit parts 212 or the signal processing circuit parts 314. In this way, in a case where the substrate 14 is deflected, positional deviation easily occurs in the connecting positions of the cables 222 and the cables 322.

In contrast, in the radiographic imaging apparatus 1 of the present embodiment, the signal processing unit 104 and the sensor board 12 can be connected together by the connectors 330 and the connectors 336. Therefore, in the sensor board 12, deviation of the connecting positions of the cables (the cables 322 in the present embodiment) on which the signal processing circuit parts 314 are mounted can be suppressed. Additionally, attachment and detachment of the signal processing unit 104 become easy.

Therefore, according to the radiographic imaging apparatus 1 of the present embodiment, the reworking on the sensor board 12 can be easily performed.

In addition, a form in which the driving substrate 202 and the cables 222 are connected together by the connectors 236 and the signal processing board 304 and the cables 322 are connected together by the connectors 336 is illustrated in FIG. 4. However, the invention is not limited to the form illustrated in FIG. 4. For example, the driving substrate 202 and the cables 222 may be connected together by thermocompression, and the signal processing board 304 and the cables 322 may be connected together by thermocompression. For example, at least one of the driving substrate 202 and cables 222 or the signal processing board 304 and the cables 322 may be connected together by other methods, such as thermocompression.

Figure 5:
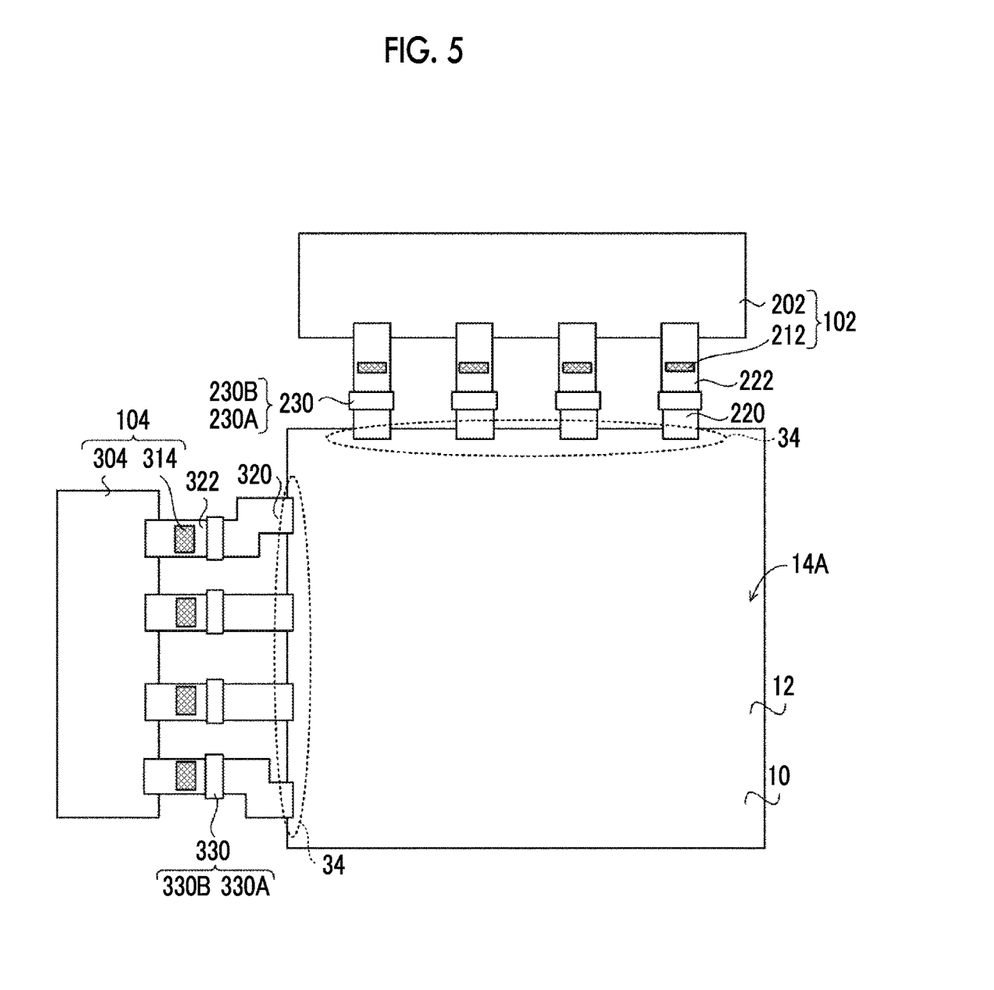
FIG. 5 is a plan view of another example of the state where the drive unit and the signal processing unit are connected to the radiation detector of the first embodiment, as seen from the first surface side of the substrate.

As an example, unlike the form illustrated in FIG. 4, a form in which no connectors 236A are provided in the cables 222, no connectors 236B are not provided in the driving substrate 202, and the cables 222 and the driving substrate 202 are connected together by thermocompression is illustrated in FIG. 5. Additionally, unlike the form illustrated in FIG. 4, a state where no connectors 336A are provided in the cables 322, no connectors 336B are provided in the signal processing board 304, and the cables 322 and the signal processing board 304 are connected together by thermocompression is illustrated in the form illustrated in FIG. 5. The terminal regions 34 in this case is an example of a thermocompression part of the present embodiment.

Second Embodiment

Figure 6:
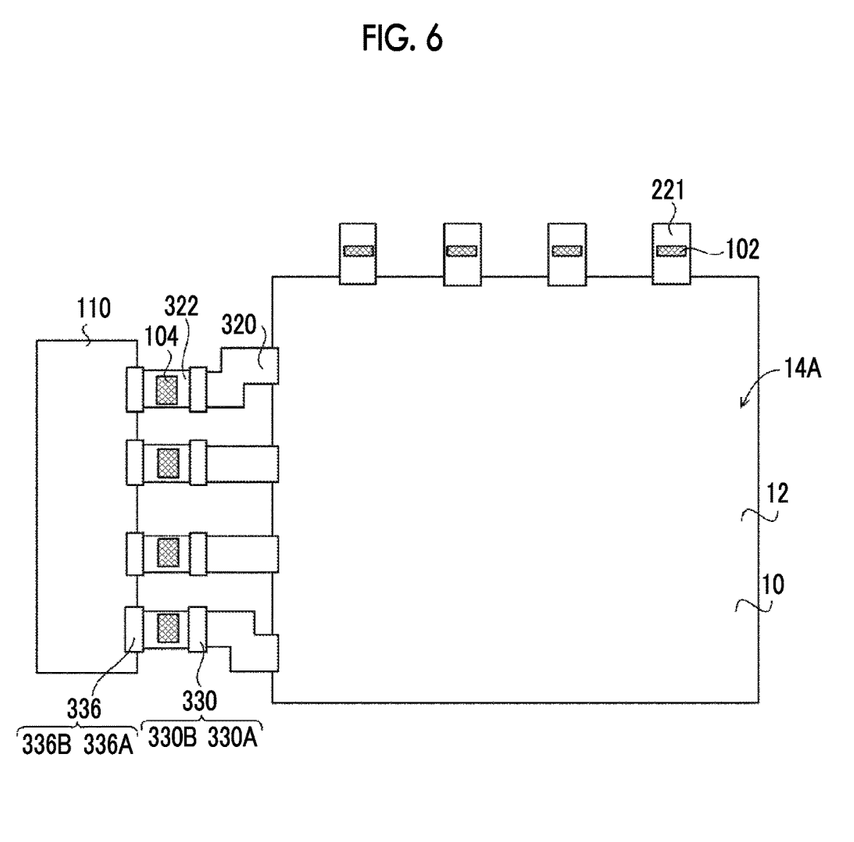
FIG. 6 is a plan view of an example of a state where cables are connected to the terminal regions of the radiation detector of a second embodiment, as seen from the first surface side of the substrate.

A plan view of an example of a state where drive units 102 and signal processing units 104 are connected to the radiation detector 10 of the present embodiment, as seen from the first surface 14A side of the substrate 14, is illustrated in FIG. 6.

As illustrated in FIG. 6, in the radiographic imaging apparatus 1 of the present embodiment, ICs that realize the drive units 102 are mounted on cables 221, and the drive units 102 are connected to the signal lines included in the cables 221. The cables 221 of the present embodiment are examples of a third cable of the present disclosure.

Similar to the radiation detector 10 of the first embodiment, the cables 221 and the sensor board 12 are connected together by thermocompression, and the drive units 102 and the scanning wiring lines 26 of the sensor board 12 are connected together by the cables 221.

Additionally, instead of the signal processing circuit parts 314 of the first embodiment, ICs that realize the signal processing units 104 are mounted on the cables 322. The signal processing units 104 are connected to the signal lines included in the cables 322.

The signal processing units 104 and the signal wiring lines 24 of the sensor board 12 are connected together by connecting the connectors 330B of the cables 322 and the connectors 330A provided in the cables 320 connected to the sensor board 12 together.

Additionally, in the present embodiment, instead of the signal processing board 304 of the first embodiment, the connectors 336B are provided in a region of an end part of the control board 110, and the connectors 336B provided in the control board 110 and the connectors 336A of the cables 322 are connected together. In this way, in the radiographic imaging apparatus 1 of the present embodiment, the control board 110 and the signal processing units 104 are connected together by the connectors 336.

In this way, in the radiographic imaging apparatus 1 of the present embodiment, the connectors 330A are provided in the cables 320 connected to the sensor board 12 of the radiation detector 10.

Accordingly, in the radiographic imaging apparatus 1 of the present embodiment, in a case where the signal processing units 104 are connected to the sensor board 12, the cables 322 on which the signal processing units 104 are mounted may be connected to the cables 320 connected to the sensor board 12 by the connectors 330.

In this way, the signal processing units 104 and the sensor board 12 can be connected together by the connectors 330. Therefore, deviation of the connecting positions of the cables (the cables 322 in the present embodiment) on which the signal processing units 104 are mounted can be suppressed in the sensor board 12. Additionally, attachment and detachment of the signal processing units 104 become easy.

Additionally, in the radiographic imaging apparatus 1 of the present embodiment, the control board 110 and the signal processing units 104 can be connected together by the connectors 336. Therefore, for example, in a case where a problem has occurred in any one of the signal processing units 104 or the control board 110, one in which the problem has not occurred can be used as it is.

Therefore, according to the radiographic imaging apparatus 1 of the present embodiment, the reworking on the sensor board 12 can be easily performed.

In addition, in the radiographic imaging apparatus 1 illustrated in FIG. 6, cables 221 on which drive units 102 are mounted are directly connected to the sensor board 12. However, ICs that are the drive units 102 have a weight of about 1/10 compared to ICs that are the signal processing units 104, and is relatively light in weight. For that reason, in connection to the cables 221, for example, the deflection of the substrate 14 by the weight of the connected drive units 102 is suppressed. Therefore, positional deviation does not occur easily. For that reason, even in a case where the cables 221 on which the drive units 102 are mounted are directly connected to the sensor board 12 as in the radiographic imaging apparatus 1 of the present embodiment, the reworking does not become difficult in many cases.

Figure 7:
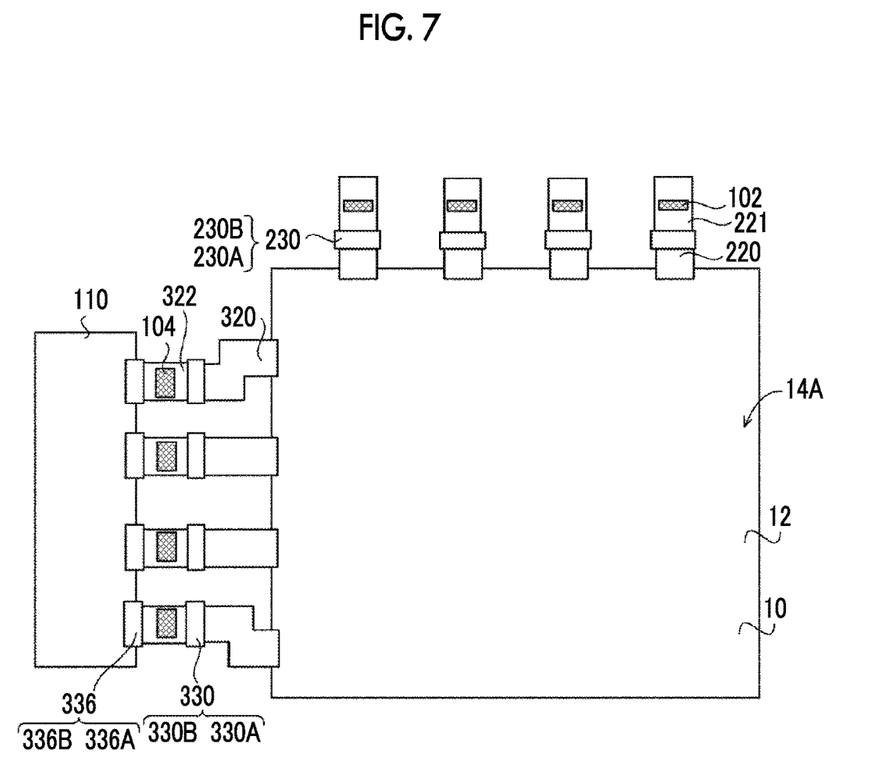
FIG. 7 is a plan view of an example of a state where drive units and signal processing units are connected to the terminal regions of the radiation detector of the second embodiment, as seen from the first surface side of the substrate.

In addition, as illustrated in FIG. 7, the cables 220 provided with the connectors 230A may be connected to the sensor board 12 similar to the first embodiment, and the cables 221 on which the drive units 102 are mounted may also be provided with the connectors 230B. In this case, since the drive units 102 and the scanning wiring lines 26 can be connected together by connecting the cables 220 and the cables 221 together by the connectors 230, the reworking can be easily performed.

Figure 8:
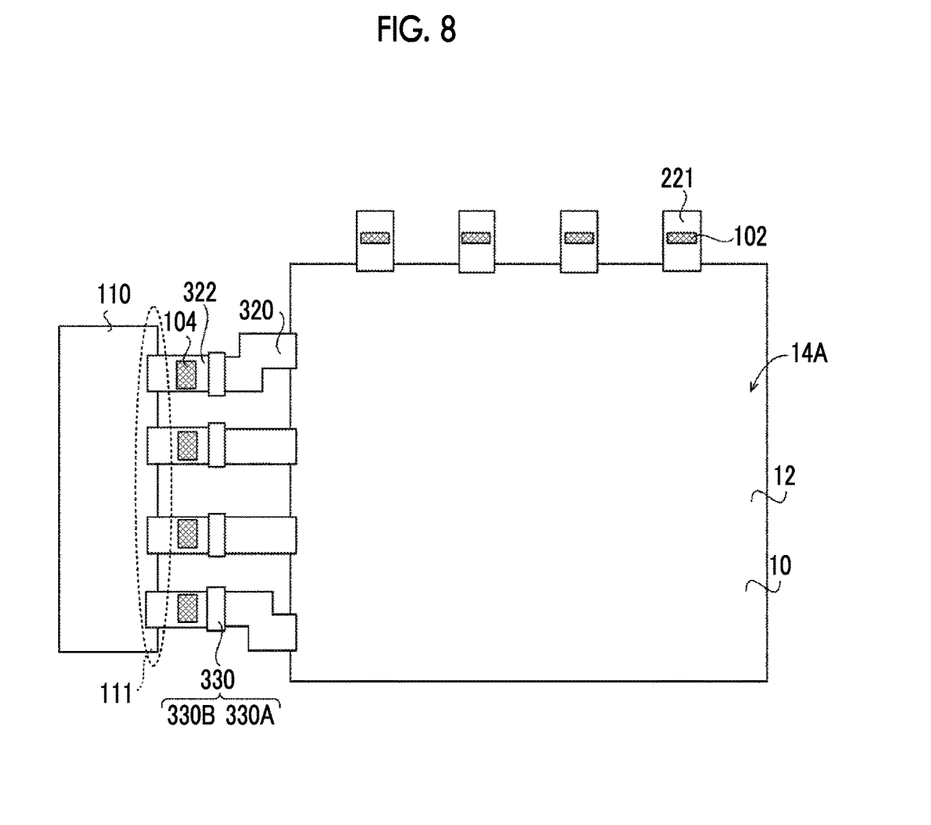
FIG. 8 is a plan view of another example of the state where the drive units and the signal processing units are connected to the terminal regions of the radiation detector of the second embodiment, as seen from the first surface side of the substrate.

In addition, although a form in which the control board 110 and the cables 322 are connected together by the connectors 336 is illustrated in FIG. 6, the invention is not limited to the form illustrated in FIG. 6. For example, as illustrated in FIG. 8, the control board 110 and the cables 322 may be connected together by thermocompression in thermocompression parts 111 provided at the end part of the control board 110. According to the radiographic imaging apparatus 1 of the present embodiment, for example, even the cables 322 in a state where the control board 110 is connected can be easily connected by the connectors 330, and can be easily detached. Therefore, the reworking on the sensor board 12 can be easily performed.

Third Embodiment

Figure 9:
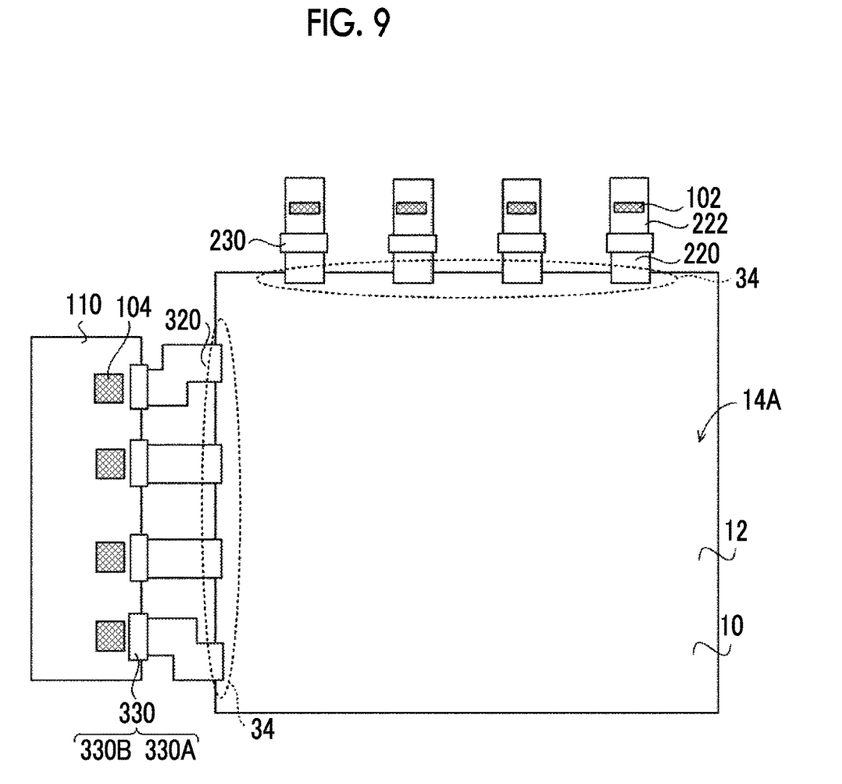
FIG. 9 is a plan view of an example of a state where cables are connected to the terminal regions of the radiation detector of a third embodiment, as seen from the first surface side of the substrate.

A plan view of an example of a state where the drive units 102 and the signal processing units 104 are connected to the radiation detector 10 of the present embodiment, as seen from the first surface 14A side of the substrate 14, is illustrated in FIG. 9.

As illustrated in FIG. 9, in the radiographic imaging apparatus 1 of the present embodiment, packaged ICs that realize the signal processing units 104 are mounted on the control board 110. Additionally, the end part of the control board 110 is provided with connectors 330B for connection to the cables 320 in correspondence with the signal processing units 104, respectively. The control board 110 of the present embodiment is an example of a board of the present disclosure.

In the radiographic imaging apparatus 1 of the present embodiment, the signal processing units 104 and the signal wiring lines 24 of the sensor board 12 are connected together by connecting the connectors 330A of the cables 320 and the connectors 330B provided in the control board 110 together.

Accordingly, in the radiographic imaging apparatus 1 of the present embodiment, in a case where the signal processing units 104 are connected to the signal wiring lines 24 of the sensor board 12, the control board 110 and the cables 320 may be connected together by the connectors 330.

Therefore, similar to the radiographic imaging apparatus 1 of each of the above embodiments, in the sensor board 12, deviation of the connecting position of the control board 110 on which the signal processing units 104 are mounted can be suppressed. Additionally, attachment and detachment of the signal processing units 104 become easy.

Therefore, according to the radiographic imaging apparatus 1 of the present embodiment, the reworking on the sensor board 12 can be easily performed.

Figure 10A:
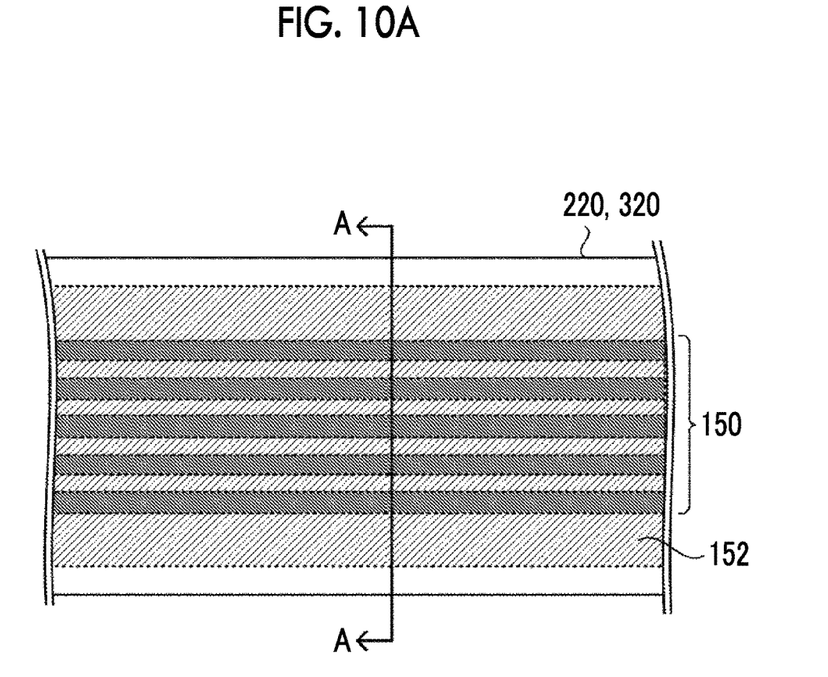
FIG. 10A is a plan view of an example of cables connected to a sensor board.
Figure 10B:
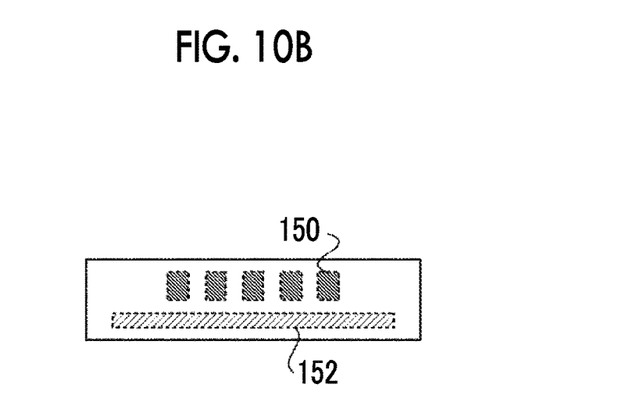
FIG. 10B is a cross-sectional view taken along line A-A of the cables illustrated in FIG. 10A.

In addition, in the radiographic imaging apparatus 1 of each of the above embodiments, the sensor board 12 is provided with at least one of the cables 220 provided with the connectors 230 and the cables 320 provided with the connectors 330, and at least one of the cables 220 and the cables 320 are connected to at least one of the drive units 102 or the signal processing units 104 via the connectors 230 and the connectors 330. For that reason, in the radiographic imaging apparatus 1 of each of the above embodiments, the total length of the cables used for these kinds of connection tends to be long. As the length of the cables becomes long, noise is likely to overlap electrical signals flowing through signal lines included in the cables. For that reason, cables obtained by performing a noise countermeasure on the cables used for these kinds of connection, particularly, the cables 220 and the cables 320 can be used. An example of a cable 220 and a cable 320 that have undergone a noise countermeasure is illustrated in FIG. 10. FIG. 10A illustrates a state where the cable 220 and the cable 320 are in a plan view, and FIG. 10B is a cross-sectional view taken along line A-A of FIG. 10A. In addition, although FIG. 10 illustrates, as an example, a case where each of the cable 220 and the cable 320 includes five signal lines 150, the number of signal lines 150 is not particularly limited.

Additionally, in the example illustrated in FIG. 10, a ground electrode 152 that supplies a ground potential is provided in parallel to the arrangement of the five signal lines 150 arranged in one row and in a layer separate from the signal lines 150. In this way, since the electrostatic capacity between the signal lines 150 and the ground electrode 152 is increased by providing the ground electrode 152 within the cable 220 and the cable 320, impedance can be lowered to suppress noise.

Additionally, in each of the above embodiments, as illustrated in FIG. 1, an aspect in which the pixels 16 are two-dimensionally arrayed in a matrix has been described. However, the pixels 16 may be one-dimensionally arrayed or may be arrayed in a honeycomb shape. Additionally, the shape of the pixels is also not limited, and may be a rectangular shape, or may be a polygonal shape, such as a hexagonal shape. Moreover, it goes without saying that the shape of the active area 15 is also not limited.

Additionally, the radiation detector 10 (radiographic imaging apparatus 1) of each of the above embodiments may be applied to a so-called irradiation side sampling (ISS) type in which the sensor board 12 is disposed on a side where the radiation of the conversion layer 30 enters, or may be applied to a so-called penetration side sampling (PSS) in which the sensor board 12 is disposed on a side opposite to the side where the radiation of the conversion layer 30 enters.

In addition, it goes without saying that the configurations, manufacturing methods, and the like of the radiographic imaging apparatuses 1, the radiation detectors 10, and the like that are described in the respective above embodiments are merely examples, and can be modified in accordance with situations without departing from the scope of the invention.

Explanation of References

What is claimed is:

1. A radiographic imaging apparatus comprising:
    a sensor board including a flexible substrate, and a plurality of pixels that are provided on a first surface of the substrate to accumulate electrical charges generated in accordance with light converted from radiation;
    a first flexible cable having one end electrically connected to theسensor board by thermocompression and the other end provided with a first connector; and
    at least one of: (i) a board on which a circuit part to be driven, in a case in which an electrical charge accumulated in each of the plurality of pixels is read, is mounted and which is electrically connected to the first cable by being electrically connected to the first connector, or (ii) a second flexible cable on which a circuit part to be driven, in a case in which an electrical charge accumulated in each of the plurality of pixels is read, is mounted and which is electrically connected to the first cable by one end of the second flexible cable being electrically connected to the first connector.

2. The radiographic imaging apparatus according to claim 1, further comprising:
    a control board on which a control unit that controls the reading of the electrical charges accumulated in the plurality of pixels of the sensor board is mounted,
    wherein the other end of the second cable is provided with the second connector in a case in which the second cable is provided, and the second cable and the control board are electrically connected together by the second connector.

3. The radiographic imaging apparatus according to claim 1, further comprising:
    a control board on which a control unit that controls the reading of the electrical charges accumulated in the plurality of pixels of the sensor board is mounted,
    wherein the other end of the second cable is electrically connected to the control board by a thermocompression part in a case in which the second cable is provided.

4. The radiographic imaging apparatus according to claim 1,
    wherein the circuit part includes a circuit of a signal processing unit to which electrical signals according to the electrical charges accumulated in the plurality of pixels are input and which generates and outputs image data according to the input electrical signals.

5. The radiographic imaging apparatus according to claim 1, further comprising:
a flexible third cable on which a drive unit, which causes the electrical charges to be read from the plurality of pixels, is mounted and which has one end electrically connected to the sensor board.

6. The radiographic imaging apparatus according to claim 1,
wherein the circuit part includes a circuit of a drive unit that causes the electrical charges to be read from the plurality of pixels.

7. The radiographic imaging apparatus according to claim 1,
wherein the circuit part includes a circuit of a signal processing unit to which electrical signals according to the electrical charges accumulated in the plurality of pixels are input and which generates and outputs image data according to the input electrical signals,
wherein a signal processing board is further provided, which is included in the signal processing unit and on which a circuit different from the circuit included in the circuit part is mounted,
wherein the other end of the second cable is provided with the second connector in a case in which the second cable is provided, and the second cable and the signal processing board are electrically connected together by the second connector.

8. The radiographic imaging apparatus according to claim 1,
wherein the circuit part includes a circuit of a signal processing unit to which electrical signals according to the electrical charges accumulated in the plurality of pixels are input and which generates and outputs image data according to the input electrical signals,
wherein a signal processing board is further provided, which is included in the signal processing unit and on which a circuit different from the circuit included in the circuit part is mounted, and
wherein the other end of the second cable is electrically connected to the signal processing board by a thermocompression part in a case in which the second cable is provided.

9. The radiographic imaging apparatus according to claim 1,
wherein the circuit part includes a circuit of a drive unit that causes the electrical charges to be read from the plurality of pixels,
wherein a driving substrate is further provided, which is included in the drive unit and on which a circuit different from the circuit included in the circuit part is mounted, and
wherein the other end of the second cable is provided with the second connector in a case in which the second cable is provided, and the second cable and the driving substrate are electrically connected together by the second connector.

10. The radiographic imaging apparatus according to claim 1,
wherein the circuit part includes a circuit of a drive unit that causes the electrical charges to be read from the plurality of pixels,
wherein a driving substrate is further provided, which is included in the drive unit and on which a circuit different from the circuit included in the circuit part is mounted, and
wherein the other end of the second cable is electrically connected to the driving substrate by a thermocompression part in a case in which the second cable is provided.

11. The radiographic imaging apparatus according to claim 1, wherein the first cable includes a ground electrode that supplies a predetermined ground potential.

12. The radiographic imaging apparatus according to claim 1, wherein the flexible substrate is a resinous sheet.

* * * * *